C. WENDELKEN.
BANK CHECK WRITER.
APPLICATION FILED NOV. 28, 1916.

1,340,428.

Patented May 18, 1920.
7 SHEETS—SHEET 1.

Inventor
C. Wendelken

By W. J. Fitzgerald & Co.
Attorneys

C. WENDELKEN.
BANK CHECK WRITER.
APPLICATION FILED NOV. 28, 1916.

1,340,428.

Patented May 18, 1920.
7 SHEETS—SHEET 2.

C. WENDELKEN.
BANK CHECK WRITER.
APPLICATION FILED NOV. 20, 1916.

1,340,428.

Patented May 18, 1920.
7 SHEETS—SHEET 4.

Inventor
C. Wendelken

By W. J. Fitzgerald & Co.
Attorneys

C. WENDELKEN.
BANK CHECK WRITER.
APPLICATION FILED NOV. 28, 1916.

1,340,428.

Patented May 18, 1920.
7 SHEETS—SHEET 5.

Inventor
C. Wendelken
By W.J.Fitzgerald & Co.
Attorneys

UNITED STATES PATENT OFFICE.

CHARLES WENDELKEN, OF TIVOLI, TEXAS.

BANK-CHECK WRITER.

1,340,428.  Specification of Letters Patent.  Patented May 18, 1920.

Application filed November 28, 1916. Serial No. 133,934.

*To all whom it may concern:*

Be it known that I, CHARLES WENDELKEN, a citizen of the United States, residing at Tivoli, in the county of Refugio and State of Texas, have invented certain new and useful Improvements in Bank-Check Writers; and I do hereby declare the following to be a full, clear, and exact description of the invention, such as will enable others skilled in the art to which it appertains to make and use the same.

This invention relates to a bank check writer, and has for its primary object to provide a device of this character in which a blank check may be inserted and the name of the payee typewritten thereon and the amount in figures typewritten on the same line following the name, and whereby the amount may be typewritten on the next line below the one that contains the name of the payee.

Another object of the invention is the provision of a device of the above stated character which embodies a plurality of type and a platen designed to coöperate with said type, each of said type and the platen being so constructed that they will coöperate to produce an impression through or upon the bank check that can not be altered without detection.

A further object of the invention is the provision of a device of the above stated character embodying a rotatable type disk and a plurality of keys operatively connected to said type disk whereby the latter may be rotated to bring the desired type, or the type corresponding to the key depressed, into a position to make an impression upon the blank check that is inserted in the machine.

With these and other objects in view as will appear as the description proceeds, the invention comprises the novel features of construction, combination and arrangement of parts as will be more fully described hereinafter and set forth with particularity in the appended claims.

Referring to the drawings,

Fig. 2 is a fragmentary vertical longitudinal sectional view of the rear portion of the device.

Fig. 5 is a sectional plan view taken on the line 5—5 of Fig. 3.

Similar characters of reference are used to denote like parts throughout the accompanying drawings and the following description.

Referring more particularly to the drawings, my improved bank check writer is shown to consist of a main casing or housing 1, provided with an extension 2, having in its top an opening 3 through which the key board of the device projects, whereby it may be readily and conveniently operated.

As clearly shown in Fig. 2 of the drawings, the top 4 of the main casing 1 is provided centrally with an opening 5, and positioned beneath the top 4 and in alinement with this opening 5 is a supporting sleeve 6, provided with laterally projecting arms 7 securely held in brackets 8 fixed to the underneath surface of the top 4. Disposed vertically through this supporting sleeve 6 and in spaced relation thereto is a bearing sleeve 9 that extends upwardly and centrally from the hollow dome 10 of a rotatable type disk 11. The bottom edge of the supporting sleeve 6 is beveled inwardly to provide a bearing shoulder 12, while the point of connection of the bearing sleeve with the hollow dome 10 is curved so as to provide a ball race 13 in which are positioned a plurality of ball bearings 14 designed to reduce the friction between the bearing sleeve and the supporting sleeve to a minimum. The upper end of the bearing sleeve 9 is exteriorly threaded and is provided with a cone collar 15. The upper end of the opening of the supporting sleeve 6 is beveled to provide a bearing shoulder 16 and between this shoulder 16 and the cone collar 15 are positioned a plurality of ball bearings 17, designed to support the weight of the rotatable type disk, and to reduce the friction between the bearing sleeve and the supporting sleeve to a minimum.

Positioned within the bearing sleeve 9 is a vertically movable plunger 18 provided circumferentially with a plurality of spiral grooves 19 to receive the spiral threads 20 on the inner surface of the bearing sleeve 9. The upper end of this vertically movable plunger is pivotally connected, as at 21, to a supporting knuckle 22, which in turn is pivotally connected to a lug 23 carried by the outer end of a rocker arm 24, as indicated at 25. The pivot 21 extends at right angles to the pivot 25, whereby the plunger 18 may be moved up and down vertically and yet allow of a relative movement between the parts connecting it with the rocker arm 24.

This rocker arm 24 extends horizontally above the top 4 of the machine and through an opening 26 formed in the rear raised portion 27 of the top 4, and is fixed to the end of a rotatable shaft 28 that extends transversely of the casing 1 to a point adjacent one of its sides, and is mounted in suitable supporting brackets 29 secured to the main casing. This shaft 28 is provided with a downwardly extending arm 30 which extends downwardly to a point adjacent the bottom 31 of the device and has connected to its lower end a push rod 32, which extends forwardly of the main casing 1 and through the partition 33 that separates the main casing 1 from the extension 2, and is connected to the lower end of a rocker arm 34, loosely mounted on a main shaft 35.

From this construction, it will be seen that when the rocker arm 34 is swung rearwardly of the machine, it will impart a rearward movement to the arm 30 through the medium of the push rod 32, which in turn will cause the arm 24 to move downwardly; this movement in turn causing the plunger 18 to descend through the bearing sleeve 9. Since the bearing sleeve 9 is held against vertical movement and yet has free rotatable movement, it will be apparent that as the plunger 18 is moved downwardly, the bearing sleeve 9 will be caused to rotate through the medium of the spiral threads engaging the grooves 19 of the plunger. In this manner the rotatable type disk 11 is caused to rotate when desired.

In order to return the plunger 18 vertically to its normal position, I employ a retractile spring 36 that has one end connected to the lower end of the arm 30 and its opposite end connected to a lug 37 fixed to the bottom 31 of the machine.

The rotatable type disk 11 is provided on its upper surface and at its outer circumferential edge with a circular row of ratchet teeth 38, to be engaged by the end 39 of a ratchet lever 40 at a predetermined time to hold the type disk against rotation in order that the desired type may be used in printing or typewriting. This ratchet lever 40 is pivotally mounted intermediate its ends, as at 41, and has its opposite end extending forwardly through the partition 33, and connected with a retractile spring 42. As clearly shown in Fig. 2 of the drawings, the end 39 of the ratchet lever 40 is held disengaged from the ratchet teeth until it is desired to lock the type disk against rotation in order that the impression of any one particular type may be made by mechanism, which will be presently described.

Figure 8:
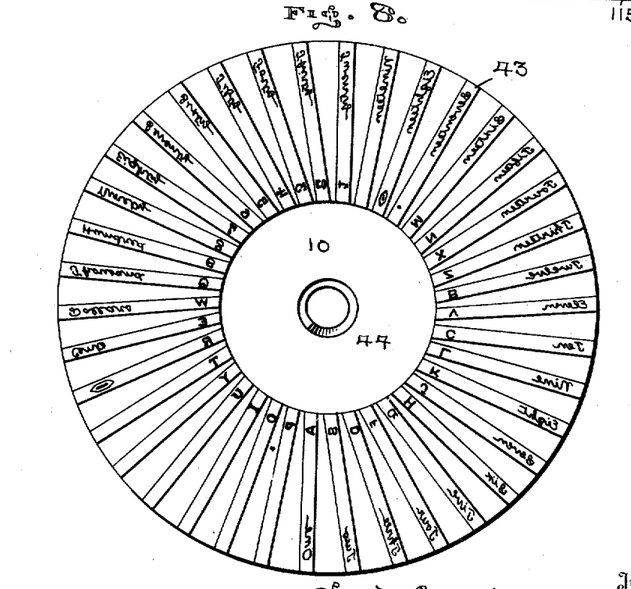
Fig. 8 is a bottom plan view of the rotatable type disk.

The type disk 11 is further provided on its bottom surface with a plurality of circumferentially extending substantially radial type 43, which extend from the outer peripheral edge of the type disk inwardly to the concentric opening 44 of the hollow dome 10. While these type appear to be almost radially disposed upon the type disk, it is to be understood that they are not disposed exactly radial but are arranged tangential to the vertical axis of the disk. From this it will be seen that the type, which are substantially opposite each other, are so arranged on the disk that they will not be in direct alinement with each other throughout their entire length, but the type on one side will be in a line parallel with the line of type on the opposite side of the disk, whereby the type on one side of the disk may be used to typewrite the name of the payee on the upper line of the check, while the type that is substantially diametrically opposite, when properly rotated may be used to typewrite the amount of the check on the second or the next line below the one on which the name of the payee was typewritten.

Again referring to Fig. 8, it will be seen that the letters which are used to typewrite the payee's name are positioned circumferentially of the type disk adjacent the concentric opening 44, while the type that are used to typewrite the amount in full are positioned circumferentially of the disk adjacent its outer circumferential edge. These type on the outer circumference of the disk are written out and run from one to twenty, and in multiples of ten from twenty to one hundred, followed by the words One thousand dollars and cents, as clearly shown. The outer row of type also include dollars and cents and any other symbols that are desirable. The inner row of type, in addition to the letters, contains the numerals from one to nine inclusive, to typewrite the amount of the check at the end of the line containing the name of the payee. The manner and means in which any one of these type just mentioned are brought into a position to make an impression upon the check will be presently described.

Pivotally mounted at one end on a transversely extending rod 45 are a pair of impression bars 46 and 47 respectively, the bar 46 being positioned beneath and at one side of the disk to be directly below and in vertical alinement with the inner circumferential row of type. The impression bar 47 is arranged on the diametrically opposite side of the type disk and is positioned to be directly beneath and in vertical alinement with the outer circumferential row of type on the disk 11. As shown, each of these impression bars 46 and 47 extends normally in a horizontal plane beneath the type disk to a point adjacent the partition 33. The rear end of each of the impression bars is provided adjacent its pivot with a hanger 48, each of which supports a rotatable crank wheel 49 formed with an eccentric cam groove 50 through which extends the laterally projecting arm 51 of a supporting rod 52 which extends vertically through an opening formed in the impression bar. The upper ends of these supporting rods 52 are provided with platens 53 and 54 respectively, the platen 53 coöperating with the inner circumferential row of type, and the platen 54 coöperating with the outer circumferential row of type. Each of these crank wheels 49 has connected to it a pitman rod 55 that extends forwardly of the main casing and the rods are connected to the lower ends of bell crank levers 56, which latter are pivotally mounted upon the forward ends of the impression bars 46 and 47.

A rocking bar 57 is pivotally mounted intermediate its ends on a vertically movable supporting arm 58, the opposite ends of this rocking bar being connected to the bell cranks 56 by links 59 that extend downwardly through openings in the forward ends of the impression bars. Mounted on the opposite side of the partition 33 and pivotally mounted intermediate its ends for horizontal movement is a locking bar 60 disposed slightly above the supporting arm 58, and has pivotally connected to its opposite ends horizontally movable locking pins 61, to project alternately over each end of the rocking bar 57 to hold one end rigid, while the opposite end is allowed vertical movement through the medium of the vertically movable supportnig arm 58. One end of this locking bar 60 has pivotally connected to it a rocker arm 62 mounted on a rock shaft 63 journaled in suitable bearings 64. Fixed to this rock shaft 63 is a horizontally extending arm 65, formed with an upstanding arm 66, provided on its upper end with a shifter key 67. This arm 66 projects upwardly through a bracket 68 supported by the front wall 69 and positioned on the arm 66 between the shifter key 67 and the bracket 68 is a coil spring 70 to return the shifter key to its normal position after having been depressed. When the shifter key 67 has been depressed, and if desired to be retained in said depressed position, it is moved laterally sufficiently to engage the arm 66 beneath the shoulder 71 of a standard 72 mounted upon the bottom 31 of the device which will retain the key in depressed position until released, when the spring 70 will return it to its normal position.

The parts just described, as will be clearly seen from the drawings, are arranged in position to print the figures in the outer circumference of the type disk so that when the vertically movable supporting arm 58 is rocked upwardly, the platen 54, together with the impression bar 47 will be moved upwardly by reason of the fact that the end of the rocking bar 57 adjacent the impression bar 46 is held substantially rigid beneath the locking pin 61. As the end of the rocking bar 57 adjacent the impression bar 47 is moved vertically upward, the bell crank lever 56 will be rocked upon its pivot, causing the crank wheel 49 to revolve, and the platen 54 to ascend into contact with the type immediately above. By a further upward movement of this end of the rocking bar 57, the impression bar 47 will have an additional tension exerted on it, which being positioned directly beneath the platen 54 will force the platen into contact with the type under tension sufficient to cause an impression to be made upon the check that is positioned between the platen and the type. When the vertically movable supporting arm 58 is released and allowed to return to normal position, the impression bar 47, together with the crank wheel 49 will be returned to normal position by the retractile spring 73. The impression bar 46 is likewise provided with a retractile spring 74 to return it to normal position. When it is desired to operate the platen 53, together with the impression bar 46, it is only necessary to depress the shifter key 67 which will rock the arm 62 and cause the locking bar to be rocked horizontally upon its pivot to move the locking pin 61 over the end of the rocking bar adjacent the impression bar 47 and at the same time release the locking pin 61 from the opposite end of the rocking bar adjacent the impression bar 46. When the shifter key has been depressed, it will cause the locking bar 60 to pivotally rotate in order that the impression bar 46 may be moved upwardly by the vertically movable supporting arm 58 to effect an impression of the letters on the inner circumference of the type disk upon the check. From the foregoing, it will be apparent that after each actuation of the impression bars 47 and 46, they will be returned to normal position by retractile springs 74.

In order to steady the rotatable type disk, by reason of its particular construction, I provide braces 73' arranged on opposite sides of the disk and suspended from the top 4. The lower end of each brace is provided with a friction roller 74' to bear and ride upon the upper surface of the rotatable type disk.

Figures 6, 7, 12, 13, 14:
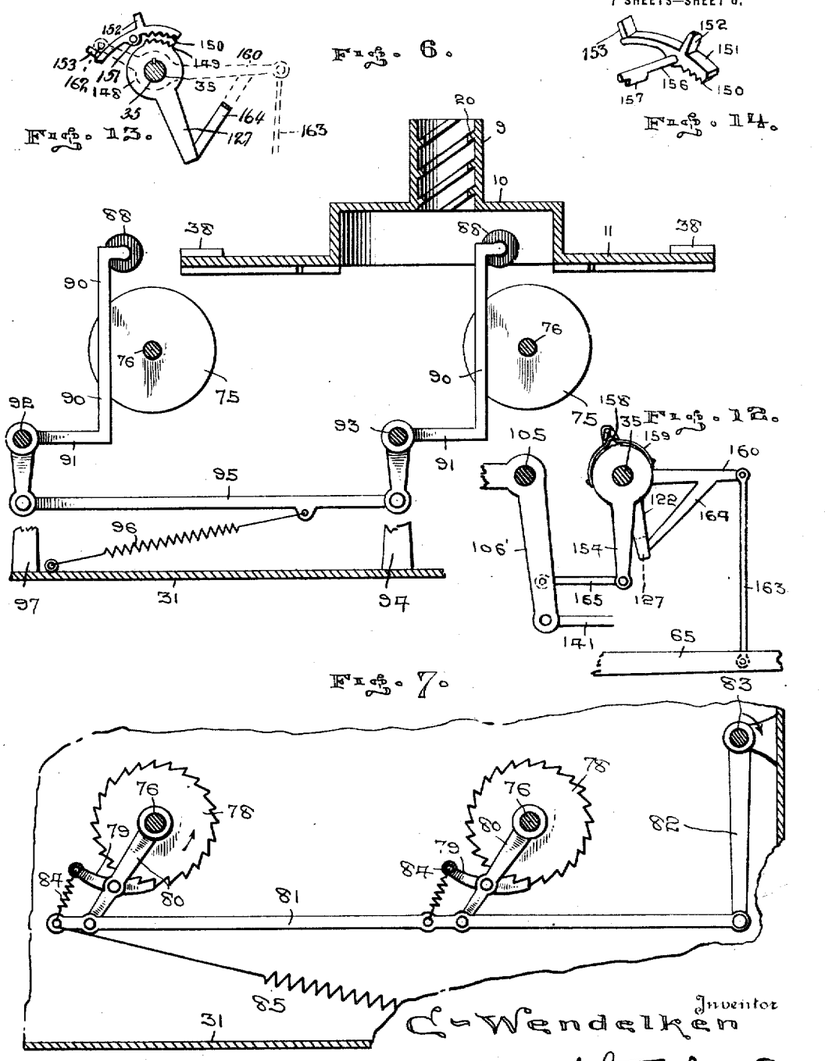
Fig. 6 is a sectional elevation taken on the line 6—6 of Fig. 2 showing the arrangement of the clamping rolls and projector wheels with respect to the rotatable type disk.
Fig. 7 is a transverse sectional view taken on the line 7—7 of Fig. 2 showing the ratchet mechanism for revolving the projector wheels step by step.
Fig. 12 is a vertical sectional view through the single spacing mechanism, showing the various parts thereof in elevation.
Fig. 13 is a vertical sectional view taken on the line 13—13 of Fig. 5.
Fig. 14 is a detail perspective view of the rock shaft and ratchet pawl fixed thereto, of the single spacing mechanism.
Figure 7:
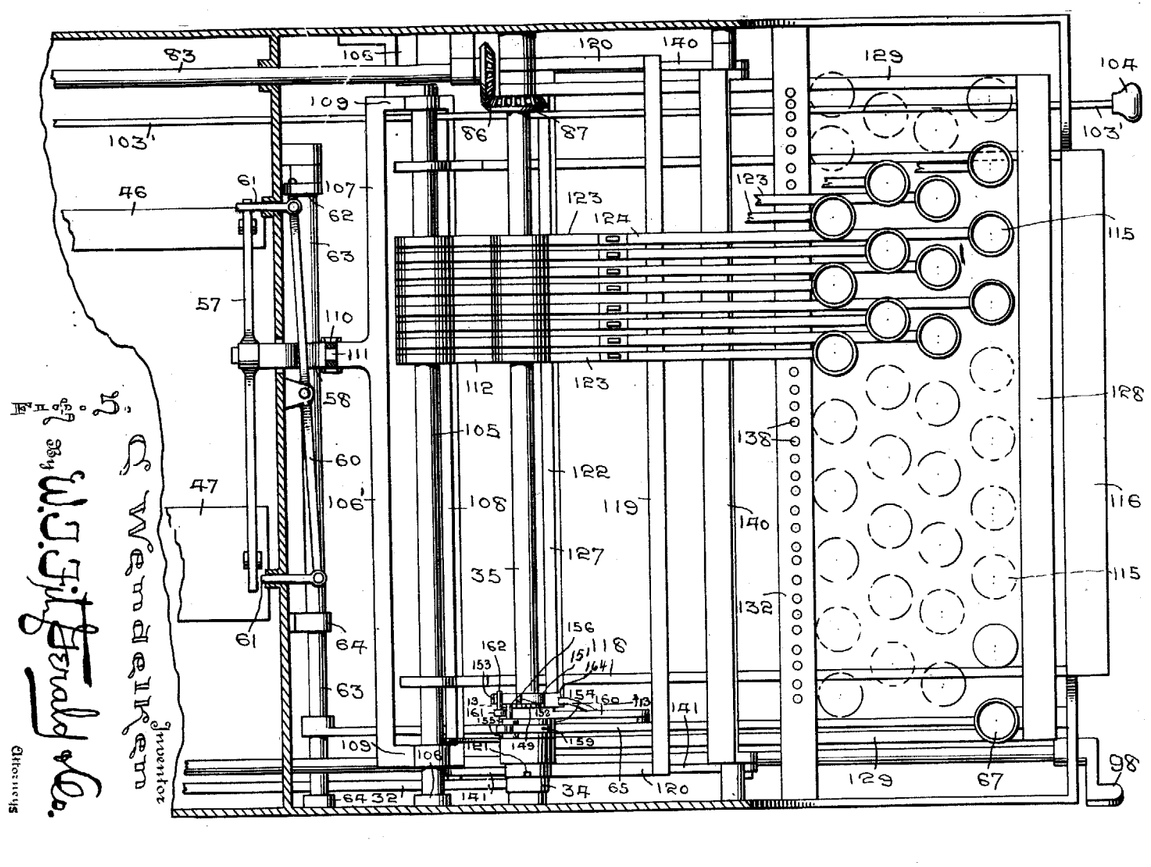

Positioned to one side of each of the impression bars is a pair of projector wheels 75 that have their peripheral edges knurled and are mounted upon a rotatable shaft 76, supported in standards 77. The rear end of each rotatable shaft 76 is provided with a ratchet wheel 78 to yieldingly engage a ratchet pawl 79 pivotally mounted intermediate its ends on a rocker arm 80 loosely mounted upon the shaft 76. The lower ends of these arms 80 are connected by a link 81, one end of which latter is pivotally connected to the lower end of a rocker arm 82, fixed on a rock shaft 83 extending longitudinally of one side of the machine. Each of these ratchet pawls 79 has one of its ends connected to the link 81 by a coil spring 84, which serves to hold the pawls in engagement with the ratchet wheels. A retractile coil spring 85 has one end connected to the casing and its opposite end connected to the link 81 to return the ratchet pawls and operating mechanism to their normal position after they have once been operated. The forward end of the rock shaft 83 is provided with a beveled gear 86 meshing with a similar gear 87 on the end of the main shaft 35. From this construction, it will be seen that upon the rotation of the main shaft 35 a given distance, a likewise rotation with be given to the rock shaft 83, which in turn will cause the ratchet pawls 79 to ratchet back over the ratchet wheel 78 so that when the shaft 35 rotates back to its normal position, the spring 85 will cause the ratchet pawls to rotate the wheels 78 the distance of one or more teeth, depending upon the distance of rotation of the shaft 35.

Positioned above each pair of these projector wheels 75 is a clamping roll 88 mounted on a horizontally disposed arm 89, of a rocker arm 90, said rocker arm being formed with a right angular extension 91 at its lower end. One of these rocker arms 90 is fixed to a rock shaft 92, while the other is fixed to a stub shaft 93 supported in suitable bearings 94. The lower ends of these right angular extensions 91 of the rocker arms are connected by a link 95, which has connected to it one end of a retractile spring 96, while the opposite end is connected to the bottom 31 of the main casing, to normally hold the clamping rolls in frictional engagement with the peripheral edges of the projector wheels. The rear end of rock shaft 92 is mounted in a suitable bearing 97, while the forward end of the shaft extends through the extension 2 of the main casing and the front wall 69, and carries a finger lever 98, which when depressed will cause the rock shaft 92 to rock the clamping rolls 88 out of engagement with the projector wheels, whereby the end of a blank check may be inserted therebetween, after which the lever 98 is released so that the clamping rolls will immediately grip and hold the check in printing position.

The side walls 99 of the casing are each provided with openings 100, whereby a blank check may be introduced into the machine in order to be typewritten, and positioned at the bottom of each of these openings 100 is an inwardly extending ledge 101 that extends into close proximity to the impression bars and projector wheels to form a support upon which the blank check is slid. To properly position the check to be typewritten on the first and second lines thereof, I provide a longitudinally movable paper guide block 102 slidably mounted on the ledge 101 and provided with a lug 102' extending downwardly through a slot 103 in the ledge 101. Threadedly connected to this lug is an adjusting rod 103', the forward end of which projects through the front wall 69 of the extension 2 and is provided with a handle knob 104, whereby the rod may be rotated in order to properly position the check.

Mounted transversely of the casing section 2 and between the main shaft 35 and the partition 33 of the main casing is an auxiliary shaft 105 journaled in suitable bearings 106. A right angular frame 106' is mounted upon and keyed to this shaft 105, and is shown to embody a cross bar 107 which carries the vertically movable supporting arm 58. This frame also embodies a bar 108 arranged directly below the shaft 105 and connected to the cross bar 107 at its ends by right angular arms 109. As shown, the arm 58 has pivotally connected to it a link 110 provided with a slot 111 through which projects the forward end of the ratchet lever 40 for vertical movement therein. The forward end of the arm 58 is bowed downwardly and extends through the partition 33, where the rocking bar 57 is pivotally mounted on its terminal end.

Loosely mounted upon the shaft 105 are a plurality of downwardly and forwardly extending arms 112, and integral with the lower ends of these arms are a plurality of actuating bars 113 which extend forwardly of the machine and are pivotally connected to a vertical rod 114 provided on its upper end with an operating key 115.

Mounted above and adjacent the front wall 69 is an accessory bar 116 supported at its opposite ends upon the forward angular ends 117 of horizontally disposed actuating bars 118, that extend rearwardly of the casing section 2 and are connected to the lower end of certain of the arms 112 loosely mounted on the auxiliary shaft 105.

A substantially U-shape cradle frame 119 is arranged horizontally and transversely of the casing, and has the rear ends of its arms 120 loosely mounted on the main shaft 35, one of which is keyed to the rocker arm 34 at one side of the casing, as indicated at 121, Fig. 5, so that when the cradle frame is depressed it will impart a rocking movement to the rocker arm 32. This main shaft 35 also supports a U-shape frame 122 that depends therefrom and is fixed to it for movement therewith. Mounted loosely on the shaft 35 are a plurality of key bars 123 through the forward ends of which loosely pass the rods 114. Each of these key bars 123 has fixed to the top thereof one end of a resilient spring 124, which extends forwardly and upwardly and is provided with an opening to receive the rod 114. Positioned upon each of the rods 114 between each of the key bars 123 and the resilient springs 124 is a coil spring 125. Each of the key bars 123 adjacent its rear end carries a downwardly and rearwardly inclined spacing arm 126 that is designed to engage and swing the lower cross bar 127 of the U-shape frame 122 rearwardly when printing words.

Each actuating arm is of such length as will swing the cross bar 127 far enough to actuate the plural spacing mechanism a number of spaces corresponding to the number of letters in the word on the key depressed plus one blank space for spacing between the word being printed and the next word to be printed.

Disposed between the accessory bar 116 and the forward row of operating keys in which the shift key 67 is located is a spacing bar 128 supported upon the angular ends of horizontally disposed arms 129, which latter extend rearwardly of the main casing 2 and are then provided with upwardly extending extensions 130 loosely mounted upon the main shaft 35. Actuating lugs 131 are formed integral with the supporting bars 129 at their point of connection with the angular extension 130, and are designed to engage the cross bar 127 of the U-shape frame 122.

Extending transversely of the casing section 2 is a cross bar 132 fixed to the side walls thereof. The key bars 123 have lugs 137 projecting from their under sides disposed in vertical alinement with adjusting screws 138 that extend upwardly through the cross bar 132. A coil spring 139 is positioned between each key bar and the cross bar 132 over the terminal ends of the lugs 137 and adjusting screws 138, to return the key bar 123 to its normal position after it has once been depressed. Each of these adjusting screws 138 is designed for the purpose of limiting and regulating the downward movement of each key bar 123, this downward movement of each key bar controlling and regulating the rotation of the type disk so that the type on the disk corresponding to the key depressed will be moved to a printing position.

Extending transversely of the casing section 2 is a locking frame 140 which is shown to be of substantially inverted U-shape and has its opposite side arms pivotally connected to the side walls of the casing. One of the side arms of this locking frame 140 is connected to one of the right angular arms 109 of the angular frame 106' by a link 141. Each of the key bars 123 is further provided with an angular lug 142 that projects downwardly adjacent the locking frame 140. When one of the key bars 123 is depressed by the initial actuation of the corresponding key 115, the angular lug 142 thereof descends to a position immediately below the cross bar of the locking frame 140, after which by a further actuation of the key 115, bar 113, frame 106' and link 141 the cross bar of the frame 140 is rocked forwardly of the machine to a position over the angular lug 142 of the key that is depressed and beneath the lugs of all of the keys that have not been depressed. From this it will be seen that only one key bar at a time may be depressed.

In order that the check may be moved through the machine the distance of one space when printing single characters or letters, A, B, etc., I employ a novel form of single spacing mechanism as follows, which is clearly shown in Figs. 3, 12, 13, 14, 15, 16 and 17 of the drawings.

The U shaped frame 122 is formed with a boss 148 at one of its pivotal ends and provided with ratchet teeth 149 adapted to be engaged by the teeth 150 of a pawl 151, this pawl being provided with an upstanding lug 152.

Loosely mounted on the shaft 35 and depending therefrom is an arm 154 which is provided on its upper pivotal end with spaced ears 155 in which is journaled a rock shaft 156 and which extends laterally and has fixed to its inner end the pawl 151. The rock shaft 156 is provided with a downwardly extending lug 157 disposed between the ears 155 which cooperates with a raised projection 158, formed on a spring 159 mounted upon and attached to the upper end of the arm 154 to normally hold the pawl 151 out of engagement with the teeth 149.

An actuating arm 160 is loosely mounted on the shaft 35, and has an arm 161 extending forwardly therefrom which carries a pin 162 that extends laterally across the pawl 151, and is adapted to engage the lug 152 and throw the pawl into locking engagement with the frame 122 when the shifter key 67 is depressed.

The outer end of the actuating arm 160 is attached to a link 163 which is in turn attached to the shifter arm 65. A link 165 is used to connect the arm 154 with the arm 109 of the angular frame 106'. The arm 160 has a rearwardly and downwardly extending actuating finger 164 that is designed to form a stop to hold the frame 122 in its normal position.

In the operation of the machine and when it is desired to print single characters it must be first set so that the single spacing mechanism will operate. In order to set the single spacing mechanism, the shifter key 67 is depressed and engaged with the hook 71, which causes bar 65 to descend, thus moving arm 164 downwardly and frame 122 rearwardly away from the action of arms 126 of all the keys, (not full limit but far enough to nullify the action of the arms 126 or the plural character spacing mechanism) yet allowing a rearward movement of the frame 122 of one space at all times when a single character is printed.

It is also to be understood that at the same time the arm 160 moves downwardly the pin 162 moves upwardly and forwardly into engagement with lug 152 causing ratchet pawl 151, carried by the arm 154, to engage the teeth 149, whereby the arm 154 will be locked rigidly to the frame 122 and shaft 35 for movement therewith. The spacing mechanism is now changed for writing single characters.

If it is desired to print say the letter A, the key 115 is depressed until the key bar 123 reaches the limit of its downward movement, which movement will rotate the type disk until the corresponding type A comes into printing position. This is accomplished by the key bar 123 depressing cradle frame 119 which is keyed to arm 34, the latter arm being in turn operatively connected to the type disk actuating mechanism.

Since the strength of the springs 124 and 125 are collectively greater than the spring 139, bar 123 and 113 will move downwardly simultaneously until the bar 123 has reached the limit of its downward movement. By this time the arm 112 of bar 113 has moved up against cross bar 108 of frame 106'.

The type disk having now been properly set and as the key 115 is further depressed, the bar 113 will move downwardly further and rearwardly moving arm 112 (which is an integral part of bar 113) and bar 108 of frame 106' forwardly. This rearward movement of frame 106' will be communicated to arm 154 through rod 165 causing shaft 35 to rock sufficiently to advance the pawls 79 one notch on the ratchet wheels 78. Upon the release of key 115 and immediately after the printing of a character, the spring 85 will cause the rollers 75 and 88 to move the check through the machine one space only.

On the initial rocking movement of the frame 106' the arm 58 will move upwardly and allow the spring 42 to throw the pawl 39 into locking engagement with the type disk thus holding the type disk immovable while the arm 58 continues upwardly and moves the impression bar 46 and its corresponding platen 53 into printing engagement with the type A. When the key 115 is released the frame 106' and the ratchet bar 40 will immediately return to their normal positions under the action of spring 143 thus allowing the type disk to return to its normal position under the action of spring 36.

When it is desired to typewrite words the machine must be set so that the plural spacing mechanism—namely the spacing arms 126—will operate independently of the single character spacing mechanism. To accordingly set the machine, the shifter key 67 is released which allows arm 160 to move upwardly and disengage the pawl 151 from the teeth 149 by virtue of the pin 162 moving into engagement with the rear elevated end of the pawl thus disconnecting arm 154 from frame 122, and allowing frame 122 to swing back to its normal position against the arm 164 which in this instance will serve as a stop for it. The machine is now ready to typewrite words.

In the operation of the machine as now set and we will say for the purpose of illustration that it is desired to typewrite the word "Twenty". By depressing the key 115, which we will assume is "Twenty", it moves key bar 123 and its respective actuating arm 126 downwardly and rearwardly into contact with frame 122. Likewise in printing words the bar 113 will move downwardly simultaneously with the bar 123 until the latter has reached the limit of its downward movement. The downward movement of the key bar 123 will act on the cradle frame 119 to rotate the type disk until the word "Twenty" comes into printing position.

At the same time the cradle frame 119 is actuated, the respective actuating arm 126 will engage and move the frame 122 rearwardly a sufficient distance to cause the shaft 35 to operate the spacing mechanism a number of spaces corresponding in number to the number of letters six in the word "Twenty" plus one blank space for spacing between the word being printed and the next word to be printed. In other words the pawls 79 will be advanced six teeth or spaces for the word "Twenty" and one tooth for the blank space between words, upon release of the key 115.

By a further depression of the key 115 arm 112 of bar 113 will rock frame 106' to lock the type disk and cause the impression bar 47 and its respective platen 54 to move upwardly into printing engagement with the type "Twenty". The rocking movement of frame 106' will of course draw link 165 with it but since the pawl 151 is disengaged from frame 122, arm 154 and the pawl carried thereby will be free to swing independent of frame 122 and shaft 35, thus in no way interfering with the action of the plural spacing arms. Immediately upon the release of key 115 the spring 85 will cause the check to move through the machine seven spaces.

When it is desired to make a blank space between the payee's given and surname, it is only necessary to depress the spacing bar 128.

Accessory bar 116 may be used if desired for repeating when writing single characters. By releasing the key 115 (after writing a character) just enough not to nullify the action of bar 113, (the check having been advanced one space by the printing of a single character) the bar 116 may be depressed to cause the impression bar 46 and its respective platen to ascend and make an impression without an additional depression of key 115. From this it will be seen that by simply holding the key bar 123 depressed with one hand, the other may be used to successively actuate the bar 116 to repeat the printing of a single character any number of times.

Bar 116 may also be used to give additional force to the impression means when writing single characters, if such action should become desirable from weariness of the fingers in operating the keys 115.

Figure 1:
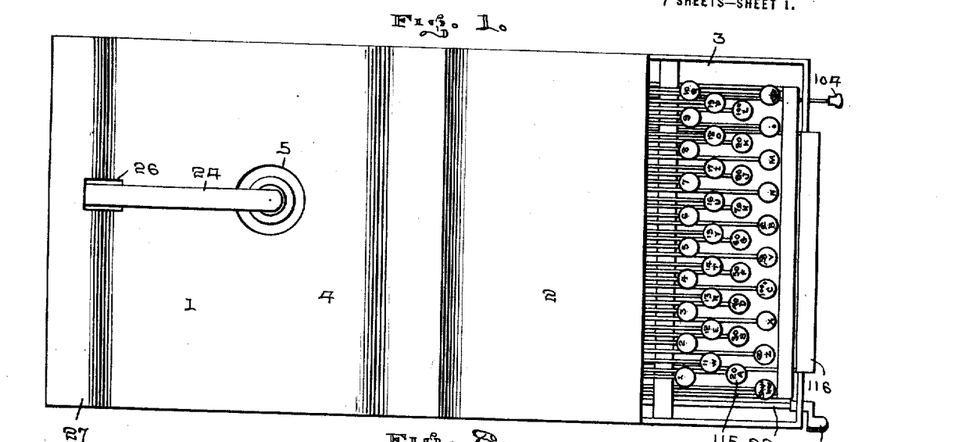
Figure 1 is a plan view of my improved bank check writer.
Figure 3:
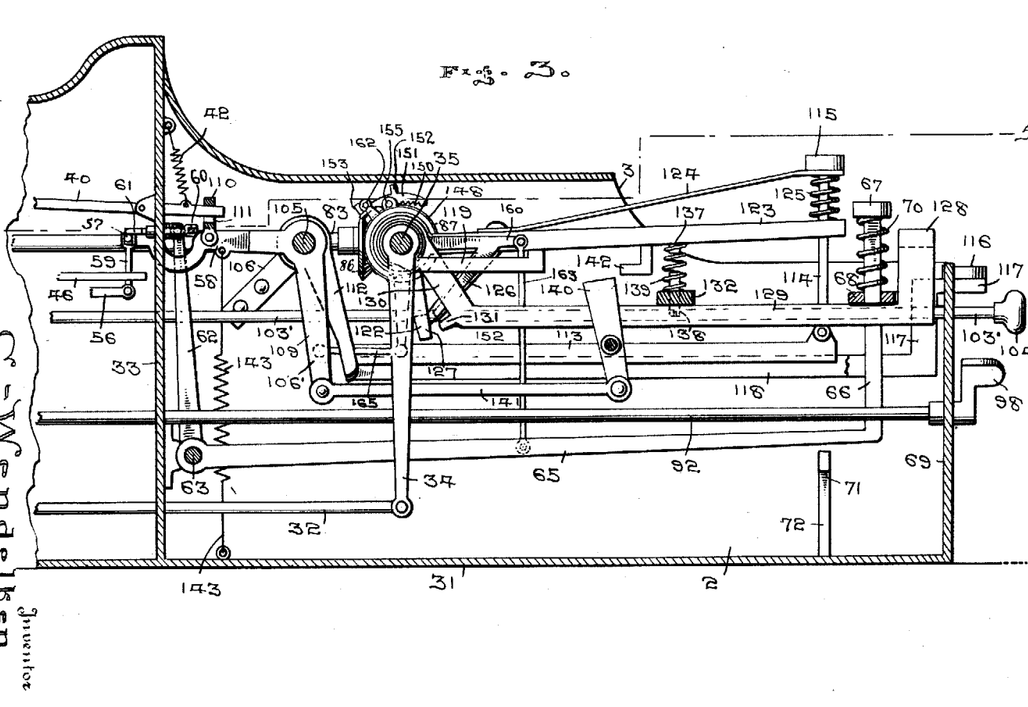
Fig. 3 is a fragmentary vertical sectional view through the front portion of the device.
Figure 4:
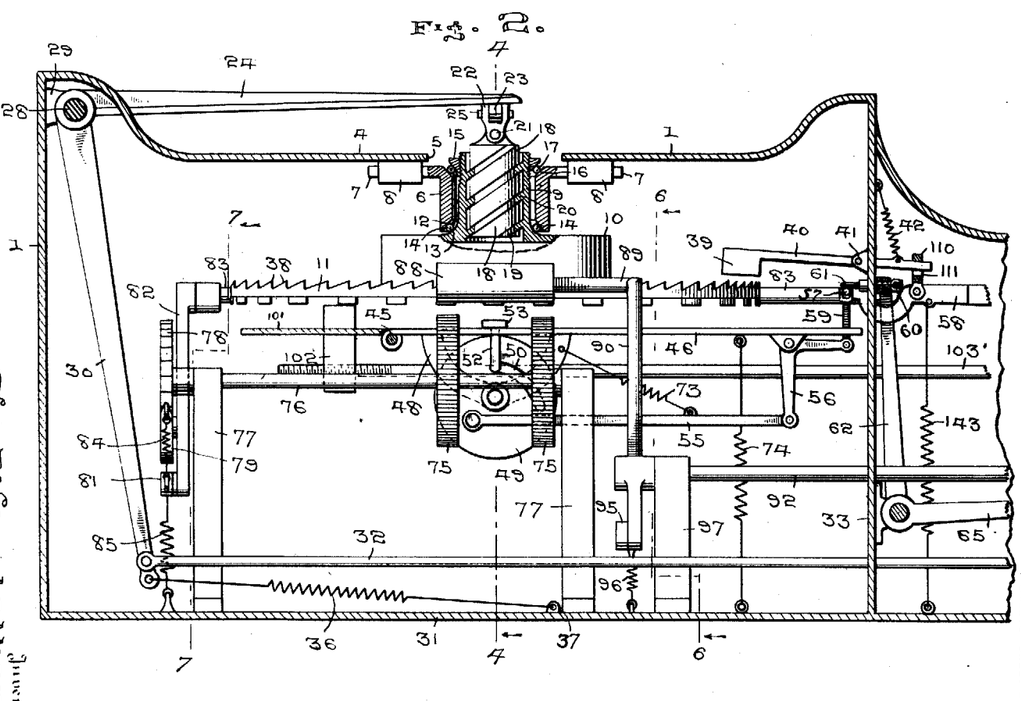
Fig. 4 is a transverse sectional view on the line 4—4 of Fig. 2.

As shown in Figs. 1 and 8 of the drawings, it will be seen that there is a type positioned upon the bottom surface of the type disk corresponding to each and all of the keys of the device shown in Fig. 1 of the drawings.

Figures 9, 10, 11:
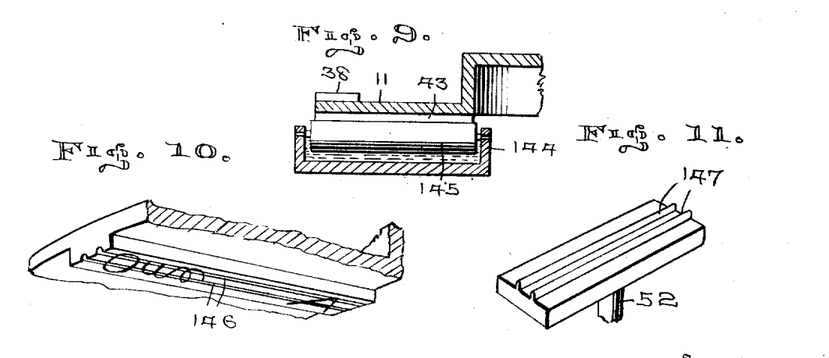
Fig. 9 is a detail sectional view of a portion of the rotatable type disk showing a form of inking mechanism for supplying the type with ink.
Fig. 10 is a perspective view of one of the type.
Fig. 11 is a perspective view of the platen designed to coöperate with the type.
Figures 15, 16, 17, 18, 19:
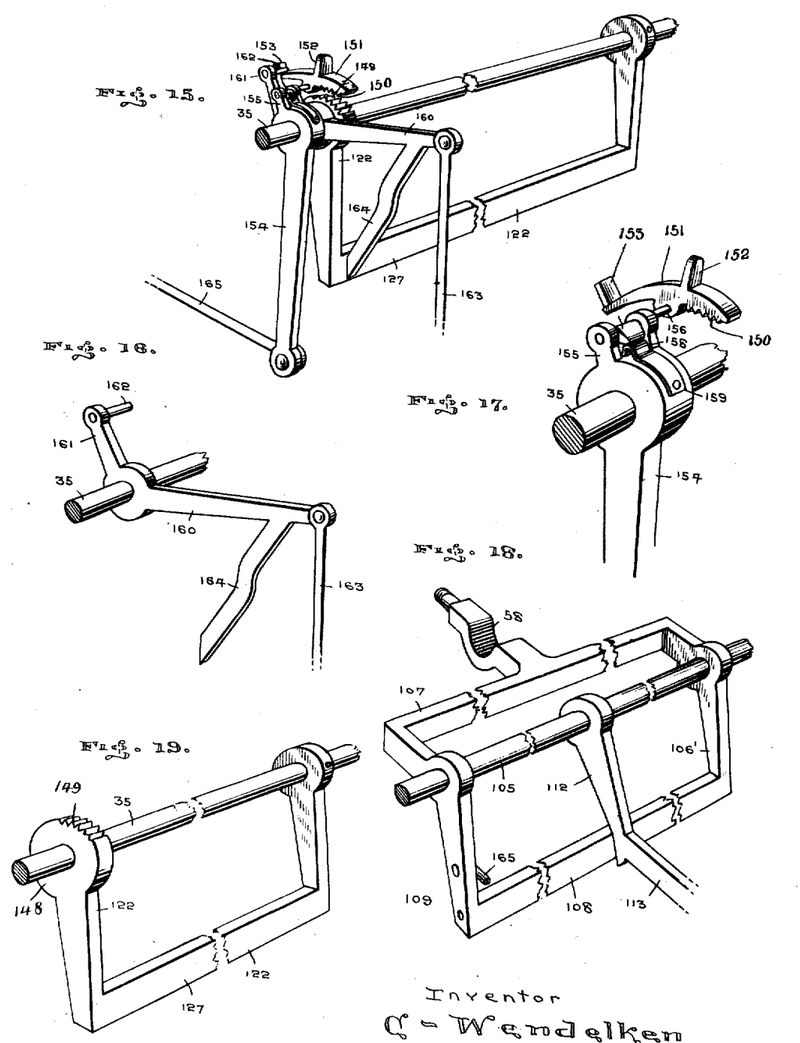
Fig. 15 is a perspective view of the spacer controlling means.
Fig. 16 is a perspective view of the arm which is operated to set the spacer device for single spacing.
Fig. 17 is a perspective view of the means operated by the arm shown in Fig. 16 to accomplish single spacing.
Fig. 18 is a perspective view of the rocking or oscillating frame operated by the key bars.
Fig. 19 is a perspective view of the oscillating frame for variable spacing.

In Fig. 9 of the drawings may be seen one form and arrangement of inking device, whereby ink may be applied to the type disk as the latter is rotated. One or more of these inking devices may be used around the circumference of the type disk if found desirable. This inking device as shown consists of an ink trough 144 in which is rotatably mounted an inking roller 145 that is designed to project above the sides of the trough, and to yieldingly engage the surface of the type. I desire to have it understood that while I have shown one form of inking device that I do not limit myself to this particular form.

In Fig. 10 will be seen a perspective view of my improved method of constructing the type of this device, wherein the symbols formed on each type are provided with longitudinally extending grooves 146.

In Fig. 11 is shown a perspective view of one of the platens used in the machine and which is shown to be formed with a plurality of longitudinally extending ribs 147 that are designed to be forced into engagement with the corresponding grooves 146 of each of the type. From this construction it will be seen that as the check is passed through between the type and platen to be printed, that the symbol will not only be printed upon the check, but the ribs 147 will force the paper into the grooves 146 in such a manner as to produce a printed check which could in no way be altered without detection.

From the foregoing description taken in connection with the accompanying drawings, the advantages of construction and the method of operation of the invention, together with the device which I now consider to be the best embodiment thereof, will be readily understood by those skilled in the art to which the invention relates, and while I have described the principle of operation of the invention, I desire to have it understood that such changes may be made when desired as are within the scope of the appended claims.

I claim:—

1. In a typewriting machine, two sets of type arranged to print at two different points of the machine, keys controlling said type, means for feeding paper past one of said points and then past the other, a platen operable in connection with each set of type, and means for nullifying the printing function of either set of type and corresponding platen.

2. A typwriting machine, two sets of type arranged to print at two different positions of the machine, keys controlling said type, a platen coöperable with each set of type, and means for selectively nullifying the printing function of either set of type and corresponding platen.

3. In a typewriting machine, two sets of type arranged to print at two different points of the machine, a set of keys controlling both sets of type, a platen coöperable with each set of type, variable-spacing paper-feeding means controlled by the keys, and means operable to condition the feeding means for either single spacing or variable plural spacing, and also operable for selectively nullifying the printing function of either set of type and corresponding platen.

4. In a typewriting machine, a set of single character type operable at one position, a set of plural character type operable at another position, a set of keys controlling both sets of type, variable-spacing paper-feeding means controlled by the keys, and means operable to condition the feeding means for either single spacing or variable plural spacing.

5. In a typewriting machine, a movable type member having a set of single character type operable at one position, and a set of plural character type operable at another position, a set of keys controlling said member for moving it to different positions, variable spacing paper-feeding means controlled by the keys, and means operable to condition the feeding means for either single spacing or variable plural spacing.

6. In a typewriting machine, a rotatable type member having concentric sets of single character and plural character type, a set of keys controlling the movement of said member, the type of one set being operable at one position and the type of the other set at another position, variable-spacing paper feeding means controlled by the keys, and means operable to condition the feeding means for single or plural spacing.

7. A bank check writer comprising a rotatable type disk, concentric rows of type positioned on said type disk, a plurality of operating keys corresponding to the number of type on said type disk, means for operatively connecting said operating keys with said type disk whereby the latter may be rotated, means for adjusting each of said keys whereby the type disk will be rotated a predetermined distance, a pair of platens adapted to coöperate with said concentric rows of type, and means for selectively actuating each of said platens to cause the platen to coöperate with said type to make an impression.

8. In a typewriting machine, a set of type arranged to print at one point of the machine, a second set of type arranged to print at another point, keys controlling the sets of type, and paper feeding means controlled by the operation of the keys to carry the paper past the first point for the operation of the first named set of type and then past the second point for the operation of the second named set of type, said points being spaced apart for the completion of the printing function of the first named set of type before the paper reaches the position for the printing function of the second named set of type, and the two sets of type being arranged to print in different lines on the paper first on one line and then on another by the single movement of the paper in one direction.

9. In a bank check writer, the combination with the casing thereof provided centrally with an opening in the top thereof, a supporting sleeve fixed to the casing below said opening, a bearing sleeve disposed through said supporting sleeve and arranged in spaced relation thereto, ball bearings positioned between the bearing sleeve and the supporting sleeve, a spiral thread formed internally of the bearing sleeve, a vertically movable plunger formed with a spiral groove disposed in said bearing sleeve and having the grooves thereof engaging the thread of the bearing sleeve, a type disk attached to the lower end of said bearing sleeve, and means for imparting a vertical movement to said plunger to cause the bearing sleeve and type disk to rotate in the supporting sleeve.

10. In a typewriting machine, a set of type arranged to print at one point of the machine, a second set of type arranged to print at another point of the machine, one set of type having single characters and the other set having plural characters, keys controlling the operation of said type whereby either set can be operated, and variable-spacing paper-feeding means controlled by the operation of the keys to feed the paper past the first named point for the operation of the first named type, and then past the other point for the operation of the second named type, said points being spaced apart for the completion of the printing function of the first named type before the paper reaches a position for the operation of the second named type, and the two sets of type being arranged to print on different lines of the paper during the single movement of the paper in one direction.

11. In a typewriting machine, a set of type arranged to print at one point of the machine, a second set of type arranged to print independently of the first named set at another point of the machine, keys for controlling said sets of type for the independent operation of either set, and means for feeding a sheet of paper with a single movement in one direction past said points, said points being arranged for the completion of the printing function of the first named set of type before the paper reaches a position for the printing function of the second named set of type, in order that the allotted work of the first named set of type can be completed before the paper reaches a position for the allotted work of the second named set of type, and the two sets of type being arranged to print on different lines of the paper, so that a plurality of lines can be typewritten in the single movement of the paper in one direction.

12. In a typewriting machine, a movable type member having a set of single character type and a set of plural character type, a set of keys controlling said member, one set of type being arranged to print at one position and the other set to print at another position, and variable spacing paper feeding means controlled by the keys and adapted to be conditioned for either single spacing or plural spacing.

13. In a typewriting machine, a type disk having two concentric sets of type, one set to print at one point, and the other set to print at a point at the opposite side of the axis of said disk, means for turning said disk to different positions, and means for feeding paper past said points in succession for the operation of one set and then the other set of type.

14. In a typewriting machine, a type disk mounted for rotation and having concentric sets of single character type and plural character type arranged to print at points at opposite sides of the axis of said disk, means for turning said disk to different positions, and variable spacing means for feeding paper past said points in succession to be operated on by one set and then the other set of type.

15. In a bank check writer, the combination with a type disk, of projector wheels disposed on opposite sides of said disk, ratchet mechanism for rotating said projector wheels, a main shaft, means operatively connecting said main shaft with the ratchet mechanism, a substantially U-shaped frame fixed on the main shaft, a plurality of operating keys mounted on the main shaft, and actuating arms projecting downwardly from each of said keys and adapted to engage and rock said U-shaped frame to actuate the ratchet mechanism one or more steps.

16. In a bank check writer, the combination with a type disk, of projector wheels disposed on opposite sides of said disk, ratchet mechanism for rotating said projector wheels, a main shaft, means operatively connecting said main shaft with the ratchet mechanism, a substantially U-shaped frame fixed on the main shaft, a pair of arms mounted on the main shaft, an actuating arm carried by each pair of arms, and a spacer bar connecting the free ends of said pair of arms whereby when the spacer bar is depressed, the projector wheels will be rotated one step.

17. In a typewriting machine, a type disk having concentric sets of single character type and plural character type, said disk being mounted for rotation and the two sets of type being arranged to print at points at opposite sides of the axis of the disk, a set of keys controlling said disk for turning it to different positions selectively, variable-spacing paper-feeding means to feed the paper past said points in succession for the operation of one set and then the other set of type, and means operable to condition the feeding means for either single or plural spacing.

18. In a typewriting machine, a type disk mounted for rotation and having concentric sets of single character type and plural character type arranged to print at different positions, a single set of keys controlling said disk to turn it to different positions, variable spacing paper feeding means controlled by the keys, and means operable to condition the feeding means for either single spacing or variable plural spacing.

19. In a bank check writer, the combination with a type disk, of spacing mechanism, a main shaft, means operatively connecting said main shaft with the spacing mechanism, a substantially U-shaped frame fixed on the main shaft, a plurality of type operating keys mounted on the main shaft and adapted to actuate said U-shaped frame, an auxiliary shaft, an angular frame fixed on the auxiliary shaft, a plurality of actuating arms loosely mounted on said shaft to operate the annular frame, means connecting said actuating arms with the type operating keys, ratchet mechanism fixed to said main shaft, and means connecting said ratchet mechanism with the angular frame on the auxiliary shaft, whereby the spacing mechanism will be moved one step upon the depression of a type operating key when typewriting letters.

20. In a bank check writer, the combination with a type disk, of spacing mechanism, a main shaft, means operatively connecting the spacing mechanism with the main shaft, a substantially U-shaped frame fixed on the main shaft, a plurality of operating keys loosely mounted on the main shaft, actuating arms projecting downwardly from each of said keys and adapted to actuate said U-shaped frame, each actuating arm being of a predetermined length to produce the proper spacing when printing a single word.

21. In a bank check writer, the combination with a type disk having a circumferential row of ratchet teeth thereon, means for rotating said type disk to the desired printing position, a ratchet lever pivotally mounted and adapted to engage said ratchet teeth and hold the disk against rotation when in printing position, impression means coöperating with said type disk, means for operating the impression means, a link formed with a slot connected to the last named means and adapted to receive one end of the ratchet lever and normally hold the lever out of engagement with the type disk, and a retractile spring connected to the ratchet lever and adapted to throw the lever into engagement with the type disk, when the said link is moved upwardly by the operation of the impression operating means.

22. In a bank check writer, the combination with a type disk having a circumferential row of ratchet teeth thereon, means for rotating said type disk to the desired printing position, a ratchet lever pivotally mounted and adapted to engage said row of ratchet teeth and hold the type disk against rotation when the type disk is rotated to printing position, impression mechanism operatively associated with the type disk, a link having a vertically disposed slot in its upper end and pivotally connected at its lower end to said impression mechanism, the opposite end of said ratchet lever projecting through said slot, said ratchet lever adapted to be normally held out of engagement with the type disk, and a retractile spring connected to said ratchet lever adjacent said link and adapted to move the ratchet lever into engagement with the type disk when the link is moved upwardly by the operation of the impression mechanism, said link slot permitting of a further operation of the impression mechanism after the ratchet lever has been engaged with the type disk.

In testimony whereof I have signed my name to this specification in the presence of two subscribing witnesses.

CHARLES WENDELKEN.

Witnesses:
J. R. CARPENTER,
C. B. FRIDAY.